(12) United States Patent  (10) Patent No.: US 9,108,805 B2
Thomas  (45) Date of Patent: Aug. 18, 2015

(54) CONVEYING APPARATUS

(71) Applicant: Patrick Thomas, Louisville, KY (US)

(72) Inventor: Patrick Thomas, Louisville, KY (US)

( * ) Notice: Subject to any disclaimer, the term of this patent is extended or adjusted under 35 U.S.C. 154(b) by 3 days.

(21) Appl. No.: 13/775,144

(22) Filed: Feb. 23, 2013

(65) Prior Publication Data

US 2014/0244029 A1  Aug. 28, 2014

(51) Int. Cl.
*G06F 7/00* (2006.01)
*B65G 43/08* (2006.01)

(52) U.S. Cl.
CPC ...................................... *B65G 43/08* (2013.01)

(58) Field of Classification Search
None
See application file for complete search history.

(56) References Cited

U.S. PATENT DOCUMENTS 5,547,063 A    8/1996  Bonnet
6,719,198 B2 *  4/2004  Bretl et al. .................... 235/380

* cited by examiner

*Primary Examiner* — Yolanda Cumbess
(74) *Attorney, Agent, or Firm* — Valenti, Hanley & Robinson, PLLC; Brooke J. Egan

(57) ABSTRACT

The present invention is a conveying apparatus for the bi-directional guidance of one or more objects, ingredients, products, containers, packs or packaging components from a primary location to a secondary location. Matter, such as the objects, ingredients, products, containers, packs or packaging component, supplied to the conveying apparatus from the primary location are monitored and corresponding speed and directional values are determined that are indicative of the relationship between matter supplied to the conveying apparatus and the matter being guided by the conveying apparatus to the secondary location. Based upon the speed and directional values, the conveying apparatus may be managed for bi-directional guidance of one or more objects from the primary location to the secondary location.

20 Claims, 5 Drawing Sheets

CONVEYING APPARATUS

RELATED U.S. APPLICATION DATA

This application claims priority to commonly assigned U.S. provisional application Ser. No. 61/634,216, filed Feb. 24, 2012, and entitled CONVEYING APPARATUS, the complete disclosure of which is hereby incorporated in their entirety by reference herein.

DESCRIPTION

1. Field of the Invention

The present invention is in the technical field of conveyors, as machines and equipment which guide matter, such as one or more objects, ingredients, products, containers, packs or packaging components, from one place to another. More particularly, the present invention is in the technical field of a conveyor apparatus for the bi-directional guidance, sorting, orientating, combining, indexing or unscrambling of matter, such as one or more objects, ingredients, products, containers, packs or packaging components, from a primary location to a secondary location.

2. Background of the Invention

The present invention is directed to a conveying apparatus and, in particular, to a conveying apparatus in which matter, such as one or more objects, ingredients, products, containers, packs or packaging components is supplied to the conveying apparatus from a primary location and are guided by the conveying apparatus to a secondary location. The present invention is compatible to linear sorters, including positive displacement sorters, and carousel sorters, such as a tilt-tray and cross belt sorters. It is common for matter to be supplied to a material-handling apparatus for the guidance of the products from a primary location to a secondary location. One difficulty in such material-handling apparatus is that such apparatus are typically limited to guidance in a single direction. Where a user prefers guidance in more than one direction, multiple material-handling apparatus are required, at expense to the user in terms of process speed and required process footprint. The various aspects of the present invention relate to the speed and bi-directional guidance of matter, such as one or more objects, ingredients, products, containers, packs or packaging components from a primary location to a secondary location.

SUMMARY OF THE INVENTION

Accordingly, it is an object of the present invention to overcome some of the drawbacks relating to the designs of prior art devices as discussed above. The present invention is a bi-directional conveying apparatus for guiding matter, such as one or more objects, ingredients, products, containers, packs or packaging components, from a primary location to a secondary location, which increases the performance of a one directional material-handling apparatus by ensuring speed and directional efficiency in one unit, therefore improving process speed and reducing required process footprint. In other aspects, the invention provides a conveying apparatus optimizing speed and directional guidance of matter, such as one or more objects, ingredients, products, containers, packs or packaging components, from a primary location to a secondary location having features and advantages corresponding to those discussed above. These and other objects, advantages and features of this invention will become apparent to one skilled in the art upon review of the following specification in conjunction with the drawings.

BRIEF DESCRIPTION OF THE DRAWINGS

Figure 1:
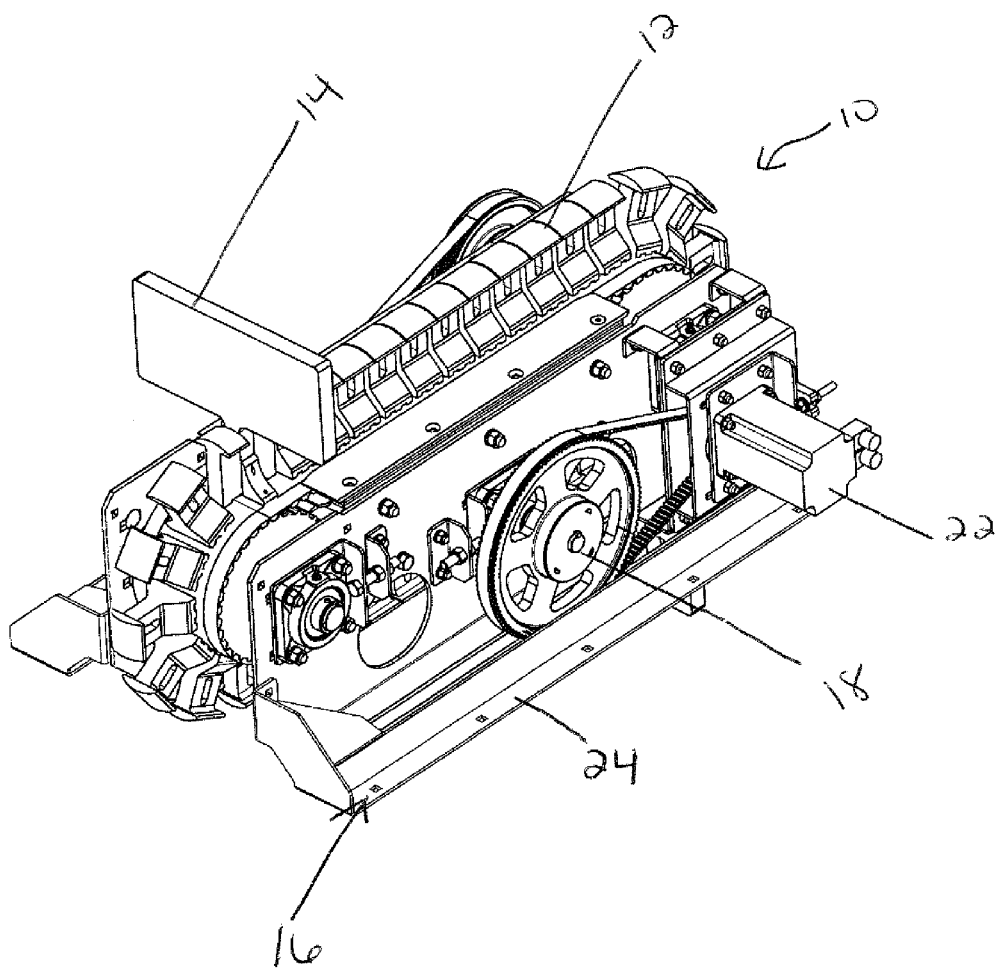
Figure 2:
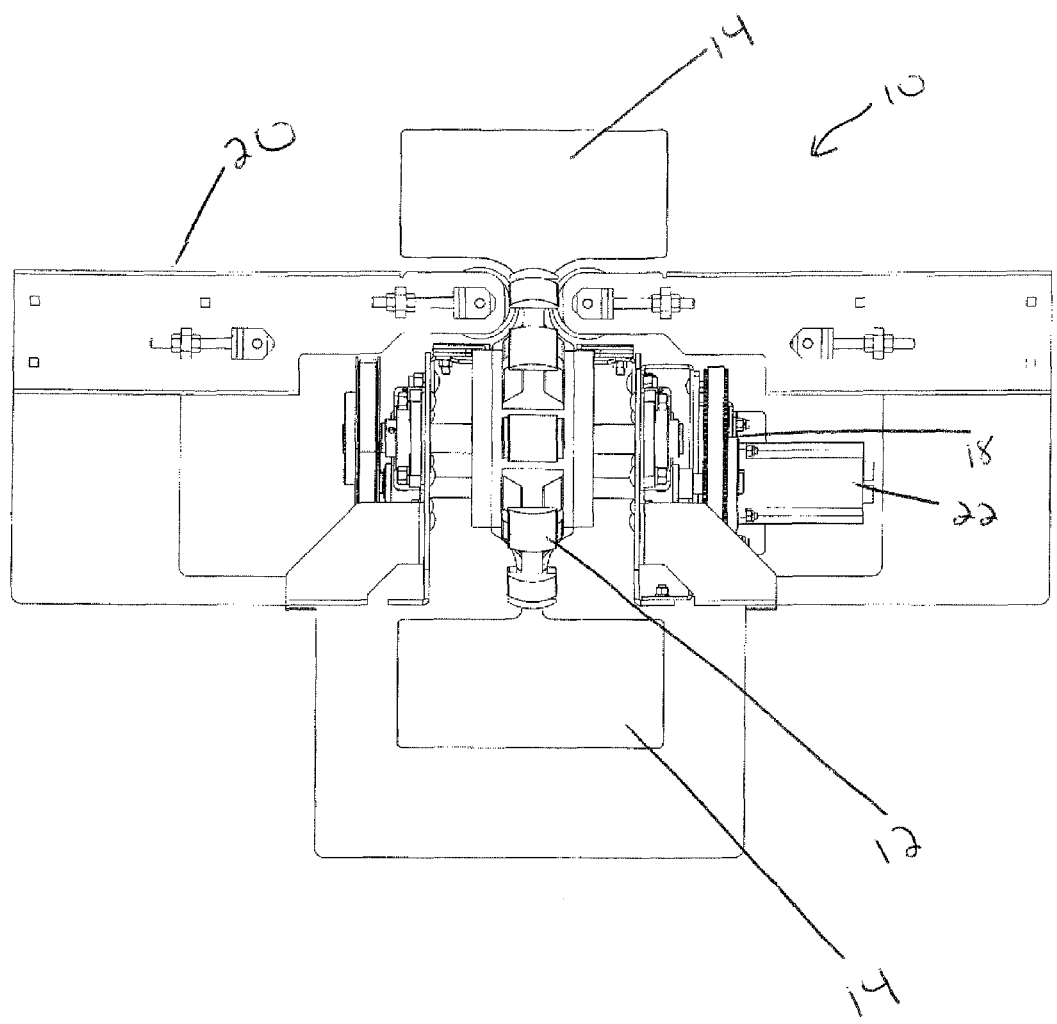
Figure 3:
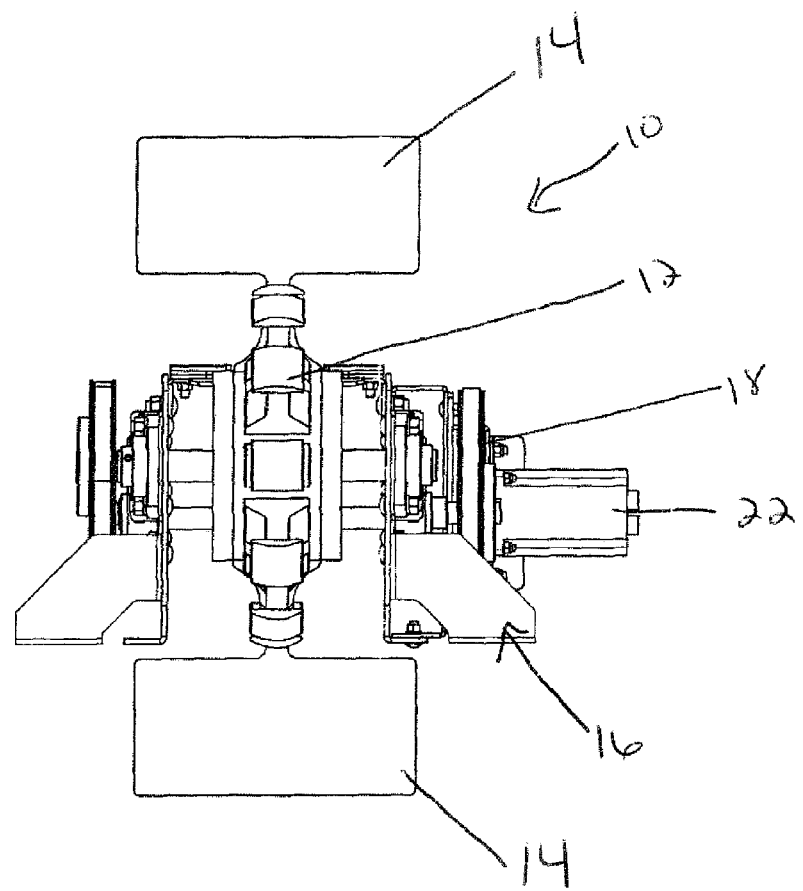
Figure 4:
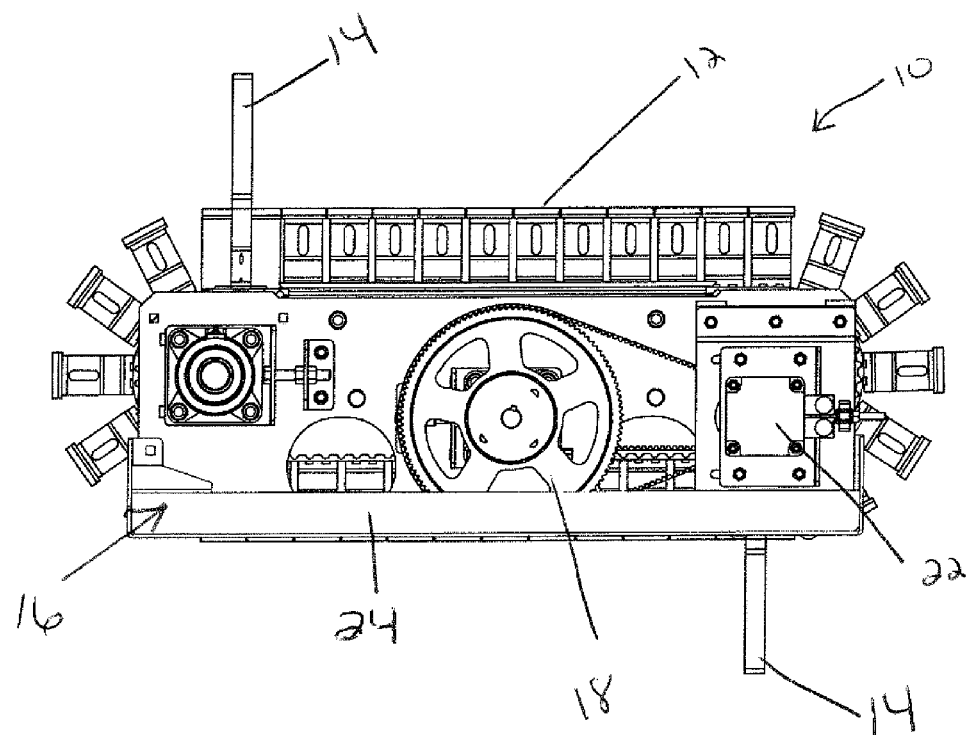
Figure 5:
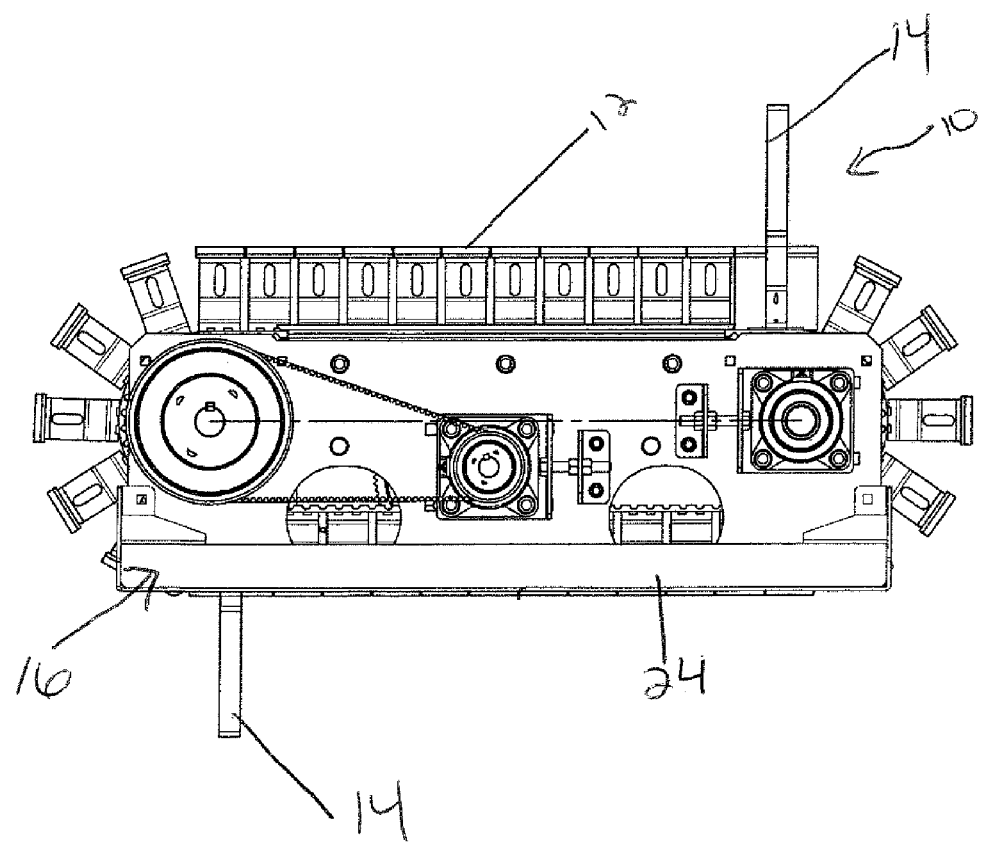

Having thus described the present invention in general terms, reference will now be made to the accompanying drawings, which are not necessarily drawn to scale, and wherein:

FIG. 1 is a perspective view of a conveying apparatus of the present invention;

FIG. 2 is a front view of the conveying apparatus of FIG. 1;

FIG. 3 is a front view of the conveying apparatus of FIG. 1, having a primary location;

FIG. 4 is a side view of the conveying apparatus of FIG. 1;

FIG. 5 is an alternate side view of the conveying apparatus of FIG. 1.

It should be understood that the drawings are for purposes of illustrating the concepts of the present invention and are not necessarily the only possible configurations for illustrating the present invention.

DESCRIPTION OF THE PREFERRED EMBODIMENT

The preferred embodiments of the present invention now will be described more fully hereinafter with reference to the accompanying drawings, in which some examples of the embodiments of the present invention are shown. Indeed, the present invention may be embodied in many different forms and should not be construed as limited to the embodiments set forth herein. Like numbers refer to like elements throughout.

The present invention is a conveying apparatus for guiding one or more objects, ingredients, products, containers, packs or packaging components from a primary location to a secondary location. Referring now specifically to the drawings of FIGS. 1-5, and the illustrative embodiments depicted therein, there is shown a conveying apparatus 10 comprising a conveyor means 12, and at least one integrally formed push plate member 14, in a novel combination operable in a novel manner. The conveyor means 12 follows a continuous loop-shaped bi-directional path of travel, having the push plate member 14 aligned in the bi-directional path and speed of travel of the conveyor means 12. The conveying apparatus 10 includes at least one driving means 18 for guiding the conveyor means 12 such that the conveyor means 12 is rotated aligned with the path and speed of travel. The driving means 18 is connected to the conveyor means 12 by at least one drive shaft means.

The conveying apparatus 10 of the present invention is configurable to guide a plurality of different sized and shaped objects, ingredients, products, containers, packs or packaging components in conjunction with varied material handling systems from a primary location to a secondary location. The construction details of the conveying apparatus 10 as shown in FIG. 1 are that the conveying apparatus 10 may of any sufficiently rigid and strong material such as high-strength plastic, metal, and the like.

The conveying apparatus 10 as shown in FIG. 1 is useful with other types of material-handling apparatus known in the art such as transverse belt sorters, stationary pusher sorters, tilt wheel sorters, and the like.

In further detail, referring to FIG. 2, the conveying apparatus 10 has a receiving end 20 from the primary location for receiving guiding matter, such as one or more objects, ingredients, products, containers, packs or packaging components and one or more discharge ends for discharging the guiding matter to the secondary location. In the preferred embodiment, only one receiving end would be active at any one time, but it is reasonably conceived that more than one receiving end could be active for operations. The receiving end 20 and discharge ends could be made up of a plurality of belt conveyors, gravity conveyors, chutes, loading or unloading dock, or the like.

Referring to FIGS. 1 and 3, the integrally formed push plate member 14 of the conveyor means 12 can function endlessly in either a frontwardly or backwardly direction and such direction is changeable during the conveying apparatus 10 use and operations. It is conceived that the push plate member 14 is substantially rigid and sufficiently wide and long to form a conveying surface for the guiding, sorting, orientating, combining, indexing or unscrambling of objects, ingredients, products, containers, packs or packaging components from a primary location to a secondary location. In the preferred embodiment, the push plate 14 is substantially a rectangle shape, although it is conceived that the push plate could be of any shape, size or angular configuration, which configuration does not otherwise extend below the plane of conveyor means 12. In the preferred embodiment, the push plate 14 is adjustably aligned with the conveyor means 12 and the secondary location.

Referring to FIGS. 1, 4 and 5, the conveyor means 12 is supported in an upright position by a frame means 16. The frame means 16 defines at least one horizontal surface 24 laterally offset from the conveyor means 10. The frame means 16 is sufficiently tall to hold the push plate member 14 a distance off the ground when the push plate member 14 is conveying around the loop-shaped path of travel. The horizontal surface 24 supports a plurality of control input means 22 and at least one status indicator.

The preferred embodiment has a plurality of status indicators which are numbered or colored or otherwise marked so as to correspond to the status of the conveyor apparatus, which may include a start switch, a stop switch, and the like. In the preferred embodiment, it is reasonably conceived that the control input means 22 may rely on electrical or mechanical energy or other propulsion source as may be configured to the driving means 18. The driving means 18 may include a variable speed and direction control means, which may be manually set or otherwise managed through real time or programmed application, such as a programmable logic controller, for bi-directional guidance of one or more objects by the conveying apparatus 10 from the primary location to the secondary location. The status indicator may include multiple color indicators, such as green, yellow, and red, utilized to indicate the status of the conveyor means 10, including status of on/off, speed, direction, and the like.

In the preferred embodiment, an object identification means located at or about the receiving end 20 may be configured to the speed and direction means for the operation of the conveyor means 12, as aligned with the push plate member 14 the guiding, sorting, orientating, combining, indexing or unscrambling of objects, ingredients, products, containers, packs or packaging components from a primary location to a secondary location. Such object identification means may include an electrical operator, such as a photo eye, photo sensor, motion detector, a mechanical operator, programmed logic controller, a human or robot operator, scale or the like. In the preferred embodiment, the driving means 18 operates the conveyor means 12 at a slightly higher speed that the receiving end 20 or secondary location.

The advantages of the present invention include, without limitation, that the conveying apparatus 10 can sort, orient, combine, index or unscramble objects, ingredients, products, containers, packs or packaging components from a primary location to a secondary location. In an alternate embodiment, the conveying apparatus 10 includes a plurality of conveying apparatus 12, configured in parallel operations.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. Other modifications will become apparent to the skilled artisan. The invention should therefore not be limited by the above described embodiment, method, and examples, but by all embodiments and methods within the scope and spirit of the invention as claimed.

The embodiments of the invention in which an exclusive property or privilege is claimed are defined as follows:

1. A conveying apparatus for guiding one or more objects, ingredients, products, containers, packs or packaging components from a primary location to a secondary location from different types of material handling system and material handling apparatus, comprising:
   a. a conveyor means, said conveyor means having a bi-directional path and variable speed of travel and having at least one associated push plate member, adapted to receive and push objects, ingredients, products, containers, packs or packaging components, said push plate member integrated with said conveying means in the bi-directional path and speed of travel;
   b. at least one driving means for guiding the conveyor means in the path and speed of travel along a continuous path closed-loop, said driving means connected to the conveyor means by at least one drive shaft means and having at least one associated control input means, managing the bi-directional and variable speed of the conveyor means;
   c. a frame means supporting the conveyor means in a substantially upright position, defining at least one generally horizontal surface laterally offset from the conveyor means to support the control input means in an upright position; and
   d. at least one status indicator aligned with the conveyor means, wherein said status indicator is supported by said frame means.

2. The conveying apparatus in claim 1, wherein said control input means is managed through a programmed application for bi-directional guidance of the one or more objects, ingredients, products, containers, packs or packaging components from a primary location to a secondary location.

3. The conveying apparatus in claim 1, wherein operation of the control input means is carried out manually or managed through a real time logic controller or a programmable logic controller.

4. The conveying apparatus in claim 1, wherein said push plate is substantially rigid, having a sufficiently wide and long surface to form a conveying surface.

5. The conveying apparatus in claim 1, wherein said push plate member is configured to receive a plurality of different sized and shaped objects, ingredients, products, containers, packs or packaging components from a primary location to a secondary location from different types of material handling system and material handling apparatus.

6. The conveying apparatus in claim 1, wherein said push plate is adjustably aligned with the conveyor means and the secondary location for the guiding, sorting, orientating, combining, indexing or unscrambling of objects, ingredients, products, containers, packs or packaging components from a primary location to a secondary location.

7. The conveying apparatus in claim 1, wherein the driving means further comprises a variable speed and bi-directional control means, wherein operation of the driving means is carried out manually or managed through a real time logic controller or a programmable logic controller.

8. The conveying apparatus in claim 1, further comprising an object identification means, wherein the object identification means communicates with the driving means for the management of the bi-directional path and variable speed of travel of the conveyor means.

9. The conveying apparatus of claim 8, wherein the object identification means is located at or about the receiving end of the conveyor means.

10. The conveying apparatus in claim 8, wherein the object identification means is a photo eye, photo sensor, motion detector, a mechanical operator, programmed logic controller, a human or robot operator or scale.

11. The conveying apparatus in claim 1, wherein said frame is sufficiently tall to hold the push plate member a distance off the ground when the push plate member is conveying the bi-directional path.

12. The conveying apparatus in claim 1, wherein said generally horizontal surface of said frame means supports at least one status indicator aligned with the conveyor means, wherein said status indicator has a plurality of indicators which are numbered or colored or otherwise marked so as to correspond to the status of the conveyor apparatus.

13. The conveying apparatus in claim 1, further comprising a plurality of conveyor means, configured in parallel operations.

14. A conveying apparatus for guiding one or more objects, ingredients, products, containers, packs or packaging components from a primary location to a secondary location from different types of material handling system and material handling apparatus, comprising:
   a. a conveyor means, said conveyor means having a continuous bi-directional path and variable speed of travel and having at least one associated push plate member adjustably aligned with the conveyor means and the secondary location for the guiding, sorting, orientating, combining, indexing or unscrambling of objects, ingredients, products, containers, packs or packaging components from a primary location to a secondary location, wherein said push plate member is adapted to receive and push objects, ingredients, products, containers, packs or packaging components, and is integrated with said conveying means in the bi-directional path and speed of travel;
   b. at least one driving means for guiding the conveyor means in the path and speed of travel along a continuous path closed-loop, said driving means connected to the conveyor means by at least one drive shaft means and having at least one associated control input means, managing the bi-directional and variable speed of the conveyor means;
   c. a frame means supporting the conveyor means in a substantially upright position, defining at least one generally horizontal surface laterally offset from the conveyor means to support the control input means in an upright position;
   d. at least one status indicator aligned with the conveyor means, wherein said status indicator is supported by said frame means; and
   e. an object identification means located at or about the receiving end of the conveyor means, wherein the object identification means communicates with the driving means for the management of the bi-directional path and variable speed of the conveyor means.

15. The conveying apparatus in claim 14, wherein the object identification means is a photo eye, photo sensor, motion detector, a mechanical operator, programmed logic controller, a human or robot operator or scale.

16. The conveying apparatus in claim 14, wherein said status indicator has a plurality of indicators which are numbered or colored or otherwise marked so as to correspond to the status of the conveyor apparatus.

17. The conveying apparatus in claim 14, further comprising a plurality of conveyor means, configured in parallel operations.

18. The conveying apparatus in claim 14, wherein operation of the control input means is carried out manually or managed through a real time logic controller or a programmable logic controller for the bi-directional guidance of the one or more objects, ingredients, products, containers, packs or packaging components from a primary location to a secondary location.

19. A conveying apparatus for guiding matter from a primary location to a secondary location, comprising:
   a. a guiding means, said guiding means having a bi-directional path and variable speed of travel and having at least one connected push plate member, wherein said push plate member is adapted to receive and push objects, ingredients, products, containers, packs or packaging components from a primary location to a secondary location and is integrated with said guiding means in the bi-directional path and speed of travel;
   b. at least one driving means for moving the guiding means in the path and speed of travel along a continuous path closed-loop, said driving means is connected to the guiding means by at least one drive shaft means and having at least one associated control input means, said control input comprises managing the bi-directional and variable speed of the guiding means;
   c. a frame means for supporting the conveyor means in a substantially upright position, wherein said frame means defines at least one generally horizontal surface laterally offset from the conveyor means to support the control input means in an upright position;
   d. at least one status indicator aligned with the conveyor means, wherein said status indicator is supported by said frame means; and
   e. an object identification means monitoring the matter incoming to the conveyor means, wherein the object identification means communicates with the driving means for the management of the bi-directional path and variable speed of the conveyor means.

20. The conveying apparatus in claim 19, wherein said status indicator has a plurality of indicators which are numbered or colored or otherwise marked so as to correspond to the status of the conveyor apparatus.

\* \* \* \* \*